United States Patent
Grace (10) Patent No.: US 11,924,489 B2
(45) Date of Patent: Mar. 5, 2024

(54) SYSTEM AND METHOD FOR PROVIDING PERSONALIZED CONTENT DELIVERY IN A BROADBAND NETWORK

(71) Applicant: Element8 Technology Investment Group Inc., Fort Worth, TX (US)

(72) Inventor: Kevin Michael Grace, Fort Worth, TX (US)

(73) Assignee: Element8 Technology Investment Group, Inc., Fort Worth, TX (US)

( * ) Notice: Subject to any disclaimer, the term of this patent is extended or adjusted under 35 U.S.C. 154(b) by 0 days.

(21) Appl. No.: 17/504,606

(22) Filed: Oct. 19, 2021

(65) Prior Publication Data

US 2023/0119006 A1    Apr. 20, 2023

(51) Int. Cl.
| | |
|---|---|
| *H04N 21/258* | (2011.01) |
| *H04L 12/26* | (2006.01) |
| *H04L 12/28* | (2006.01) |
| *H04L 43/50* | (2022.01) |
| *H04N 21/231* | (2011.01) |
| *H04N 21/482* | (2011.01) |

(52) U.S. Cl.
CPC ... *H04N 21/25891* (2013.01); *H04L 12/2801* (2013.01); *H04L 43/50* (2013.01); *H04N 21/23106* (2013.01); *H04N 21/482* (2013.01)

(58) Field of Classification Search
CPC ....... H04N 21/25891; H04N 21/23106; H04N 21/482
See application file for complete search history.

(56) References Cited

U.S. PATENT DOCUMENTS

| | | | | |
|---|---|---|---|---|
| 2013/0332620 | A1* | 12/2013 | Gahm | H04L 65/60 709/231 |
| 2015/0012661 | A1* | 1/2015 | Elmore | H04N 21/23439 709/231 |
| 2015/0326891 | A1* | 11/2015 | Austin | H04N 21/4828 725/53 |
| 2022/0303331 | A1* | 9/2022 | Svennebring | H04N 21/8456 |

* cited by examiner

Primary Examiner — Rong Le
(74) Attorney, Agent, or Firm — Schott, P.C.

(57) ABSTRACT

Personalized content delivery in a broadband network for an end-user includes a plurality of intelligent edge nodes deployed in the broadband network. Each of the plurality of intelligent edge nodes is capable of computing dynamic scores with respect to any content delivered to a corresponding end-user device connected in the broadband network. Based on a set of preference data, at least one query may be received from at least one authorized user and a corresponding response may be generated based on the preference data and the computed dynamic scores The at least one authorized user analyses the response and tag relevant content to be personalized for the end user. The at least one authorized user thereafter activates a functionality over a UI/UX interface that facilitates the end-user to access the personalized content.

16 Claims, 4 Drawing Sheets

---

Deploy a plurality of edge nodes in the broadband network wherein each of the plurality of edge nodes is capable of computing dynamic scores with respect to any content delivered to a corresponding end-user device connected in the broadband network — 402

Configure a web platform having a user interface to receive, based on preference data, at least one query from at least one authorized user — 404

Generate, based on the preference data and the computed dynamic scores, a response to the at least one query — 406

Allow the at least one authorized user to analyze the response and tag relevant content to be personalized for the end user — 408

Allow the at least one authorized user to activate a functionality over a UI/UX interface, the activated functionality facilitating the end-user to access the personalized content — 410

SYSTEM AND METHOD FOR PROVIDING PERSONALIZED CONTENT DELIVERY IN A BROADBAND NETWORK

FIELD OF THE DISCLOSURE

The present invention relates to broadband and content delivery networks and more particularly to implementation of a web platform for facilitating personalized content delivery to the end users in a broadband network.

BACKGROUND OF THE DISCLOSURE

In a centralized broadband network, the service providers provide their services through the datacenters (DC) to end-users. Any optimization pursuant to customers' or end-users' requests can be only carried by the datacenters, as other than the datacenters, there are no intelligent nodes are present in the network to customize or make any change in the data traffic and provide fast and effective solution as required. The nodes present in the centralized network cannot make any changes, customization, modification in the traffic route or push updates into the network from the datacenters. It is difficult for service providers and content service providers to analyze any issues in the network and take appropriate measures to carry out appropriate improvements.

Further, the nodes present in the centralized network are also not capable of providing any feedback to the network as such nodes are not intelligent to make decisions related to the content delivery. The centralized broadband network having non-intelligent nodes is therefor not capable of delivering content with a high speed and low latency. This issue may partially be resolved by configuring a decentralized broadband network which allows content service providers to distribute and store replicas of content or data in small storage units deployed at the edge locations. The edge locations are close to the location of the end-users, and therefore allow the content providers to moderately resolve latency issues. However, such configuration only helps in delivering the content in a standard form or as decided by the content providers. The nodes or edge nodes present in such configurations are not capable of recognizing data traffic patterns and performing necessary compute for personalizing content for end-users or customers. The end users in the network are not provided with personalized content and high speed streaming according to their personal requirements. This is due to the fact that the storage units at the edge locations are only capable of storing the replicas of the content to be delivered to the end-user devices and are not intelligent to make decisions. Also, the storage units at the edge locations do not have both the intelligence and the communication capacity to dynamically make suitable decisions and communicate the same across the network to change what is already stored in the storage units. The storage units also cannot analyze various parameters including network conditions, data patterns within an area, and historical data. Such network resources are therefore incapable of providing content to the end-users based on network conditions, customers' choices, and preferences. Further, the content providers may also not have any means to collect and consolidate various information to subsequently provide customised content to the end users for their better experience. One of the challenges the service providers and the content providers need to overcome is that collecting and processing of information is not automated due to which utilization of edge distribution technology is not efficient.

Furthermore, since the edge nodes lack intelligence, data traffic patterns across the network are not recognized by the edge nodes. Consequently, the edge nodes can not provide any information or feedback to the network to further enable improvisation in content delivery. There is also no communication back and forth among the edge nodes in the network to provide dynamic personalization of content for the customers.

In view of the above, the present subject matter as disclosed herein, aims to provide a novel system and method for automated processing of information for better utilization of edge distribution technology and facilitating personalized content delivery to the end users in a broadband network.

SUMMARY OF THE DISCLOSURE

In order to provide a holistic solution to the above-mentioned limitations, a proactive and intelligent solution is capable of facilitating personalized content delivery to the end users in a decentralized wireless broadband network.

An object of the present disclosure is to provide functionalities over an interactive UX/UI interface to allow content providers to preview content for the end-users.

Another object of the present disclosure is to provide functionalities over an interactive UX/UI interface to allow the end-users to view personalised content.

Another object of the present disclosure is to provide visibility to both content providers and service providers to consequently allow customization of content for the end-users in real-time.

An object of the present disclosure is to provide a web platform to allow the service providers and the content providers to predefine one or more decision making criteria.

An object of the present disclosure is to facilitate the service providers to provide more capacity, lower latency, and true personalization to the end-users.

Another object of the present disclosure is to provide a dynamic and automated UX/UI elements based on device, network metadata, user preferences, and preferences of the content providers as well as service providers.

According to an embodiment, a method for facilitating personalized content delivery in a broadband network for an end-user comprises: deploying a plurality of edge nodes in the broadband network, each of the plurality of edge nodes capable of computing dynamic scores with respect to any content delivered to a corresponding end-user device connected in the broadband network; configuring a web-based platform for: receiving, based on preference data, at least one query from at least one authorized user, generating, based on the preference data and the computed dynamic scores, a response to the at least one query, allowing the at least one authorized user to analyze the response and tag relevant content to be personalized for the end user; allowing the at least one authorized user to activate a functionality over a UI/UX interface, the activated functionality facilitating the end-user to access the personalized content.

According to an embodiment, the dynamic scores are computed based on one or more parameters including network conditions, content availability, location and network history.

According to an embodiment, the functionality is activated by integrating any one of: an executable button, an executable label, or a link, over the UI/UX interface.

According to an embodiment, the functionality is activated for the end-users at any of a network level, a device level, and an application level.

According to an embodiment, the at least one authorized user is a content provider and a service provider.

According to an embodiment, the functionality is a context aware functionality that is based on context of any content provided by the content provider in the broadband network.

According to an embodiment, the preference data is based on network resources, network metadata, devices, end-user preferences, content provider preferences, and service provider preferences.

According to an embodiment, further comprising configuring a personalization menu to allow the content provider to: select and tag the content for the respective end-users, continually adjust the personalised menu to best fit according to use of the Internet, applications, and functions.

According to an embodiment, each of the plurality of edge nodes is an intelligent node capable of performing deep packet inspection (DPI) and making caching decisions.

According to an embodiment, each of the plurality of edge nodes is configured to store copies of content on edge location caches.

According to an embodiment, a system for facilitating personalized content delivery in a broadband network for an end-user, the system comprising: a plurality of edge nodes deployed in the broadband network, each of the plurality of edge nodes capable of computing dynamic scores with respect to any content delivered to a corresponding end-user device connected in the broadband network; a web-based platform configured via a server for: receiving, based on preference data, at least one query from at least one authorized user, generating, based on the preference data and the computed dynamic scores, a response to the at least one query, allowing the at least one authorized user to analyse the response and tag relevant content to be personalized for the end user; allowing the at least one authorized user to activate a functionality over a UI/UX interface, the activated functionality facilitating the end-user to access the personalized content.

The afore-mentioned objectives and additional aspects of the embodiments herein will be better understood when read in conjunction with the following description and accompanying drawings. It should be understood, however, that the following descriptions, while indicating preferred embodiments and numerous specific details thereof, are given by way of illustration and not of limitation. This section is intended only to introduce certain objects and aspects of the present invention, and is therefore, not intended to define key features or scope of the subject matter of the present invention.

BRIEF DESCRIPTION OF THE DRAWINGS

The figures mentioned in this section are intended to disclose embodiments of the claimed system and method. Further, the components/modules and steps of a process are assigned reference numerals that are used throughout the description to indicate the respective components and steps. Other objects, features, and advantages of the present invention will be apparent from the following description when read with reference to the accompanying drawings:

Like reference numerals refer to like parts throughout the description of several views of the drawings.

DETAILED DESCRIPTION OF THE INVENTION

This section is intended to provide explanation and description of various possible embodiments of the present invention. The embodiments used herein, and various features and advantageous details thereof are explained more fully with reference to non-limiting embodiments illustrated in the accompanying drawings and detailed in the following description. The examples used herein are intended only to facilitate an understanding of ways in which the embodiments herein may be practiced and to further enable the person skilled in the art to practice the embodiments used herein. Also, the examples/embodiments described herein should not be construed as limiting the scope of the embodiments herein. Corresponding reference numerals indicate corresponding parts throughout the drawings.

The present invention relates to a method and a system for facilitating personalized content delivery in a broadband network for an end-user. A plurality of edge nodes is deployed in the broadband network that compute dynamic scores with respect to any content being delivered across the broadband network. A web-based platform is configured to receive at least one query from at least one authorized user. A response corresponding to the at least one query is generated based on preference data associated with the query, and the computed dynamic scores. The at least one authorized user is allowed to analyze the response and tag relevant content to be personalized for the end user. The at least one authorized user activates a functionality over a UI/UX interface wherein the activated functionality facilitates the end-user to access the personalized content.

As used herein, 'hub-home' may be a commercial or residential building located in an area where a customer premise equipment (CPE) may be installed for providing network connections.

As used herein, 'datacentre' may be a dedicated space to accommodate a plurality of computer systems, storage devices, servers, routers, network switches and other associated devices or components that are necessary in the processes of a typical telecommunication network, such as transportation of network data traffic from a server to the consumer premise equipment.

As used herein, 'user device' may be a smart electronic device capable of communicating with various other electronic devices and applications via one or more communication networks. Examples of the user device include, but not limited to, a wireless communication device, a smart phone, a tablet, a desktop, etcetera. The user device comprises: an input unit to receive one or more input data; an operating system to enable the user device to operate; a processor to process various data and information; a memory unit to store initial data, intermediary data and final data; and an output unit.

As used herein, 'module' or 'unit' refers to a device, a system, a hardware, a computer application configured to execute specific functions or instructions according to the embodiments of the present invention. The module or unit may include a single device or multiple devices configured to perform specific functions according to the present invention disclosed herein.

Terms such as 'connect', 'integrate', 'configure', and other similar terms include a physical connection, a wireless connection, a logical connection or a combination of such connections including electrical, optical, RF, infrared, or other transmission media, and include configuration of software applications to execute computer program instructions, as specific to the presently disclosed embodiments, or as may be obvious to a person skilled in the art.

Terms such as 'send', 'transfer', 'transmit' and 'receive', 'collect', 'obtain', 'access' and other similar terms refer to transmission of data between various modules and units via wired or wireless connections across a communication network.

Figure 1:
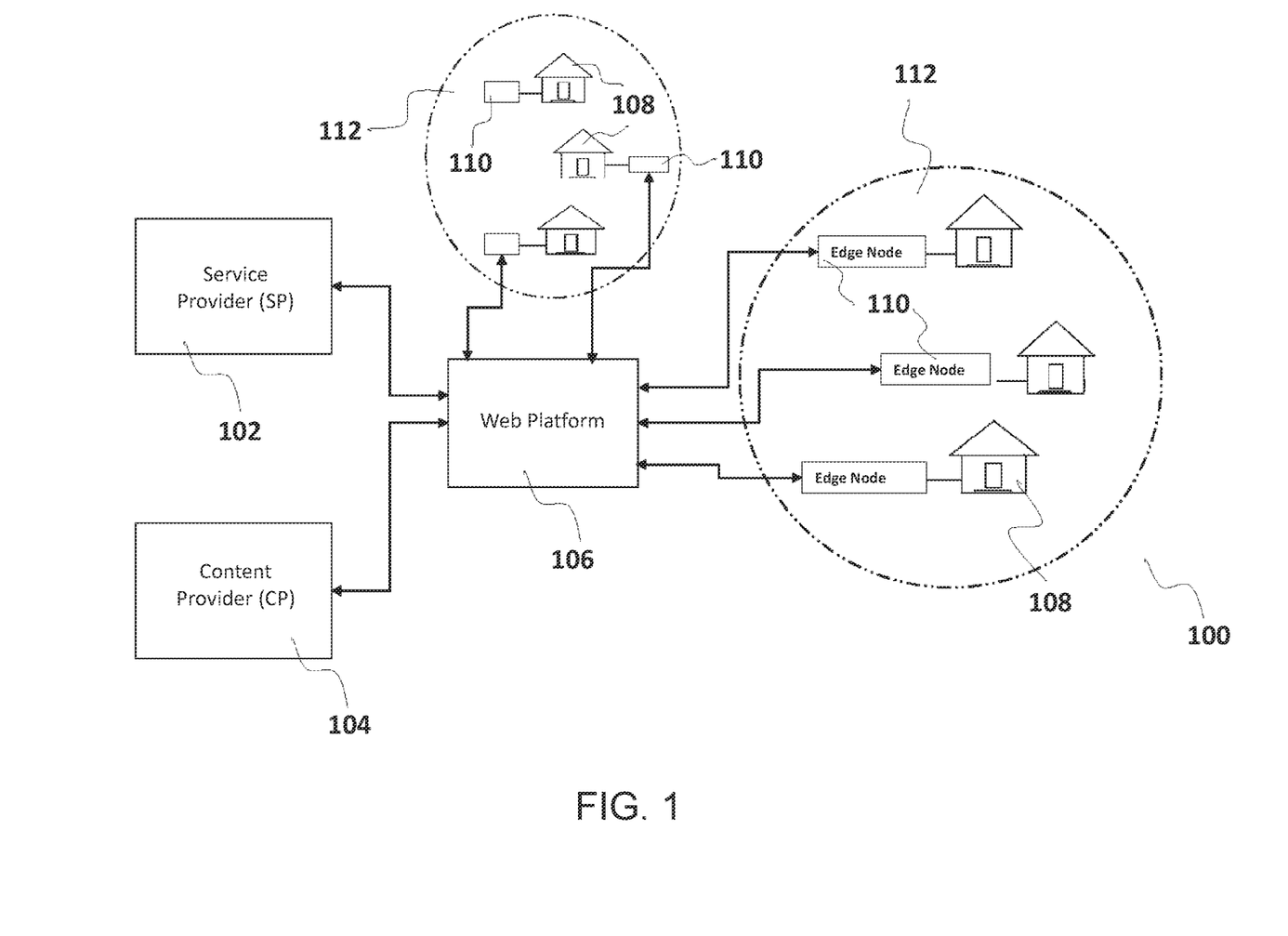
FIG. 1 illustrates a system for facilitating personalized content delivery to end users in a decentralized broadband network, according to an embodiment of the present invention.

FIG. 1 illustrates a system 100 for facilitating personalized content delivery to end users in a decentralized broadband network, according to an embodiment of the invention. The system 100 comprises a plurality of edge nodes 110 installed at a plurality of locations or areas having hub-homes 108. The system further comprises a web-based platform configured, via a server (not shown), to facilitate at least one authorized user to provide preferences as inputs and send at least one query. The at least one authorized user includes internet service providers 102 and content providers 104. The web-based platform facilitates in customization of decisions pertaining to content delivery management and personalization of content for the end users in a broadband network.

The broadband network may be configured with micro edge deployment of the edge nodes 110 at the plurality of hub-homes 108. The locations and areas, with edge nodes 110 installed at each hub-home 108, can be divided into various groups of hub-homes 108 to make a neighborhood 112. One or more neighborhoods 112 may include hub-homes 108 may belong to a community of end-users. The edge nodes 110 are thus installed at each hub-home 108 within each neighborhood 112 and within each community across the broadband network. Each of the plurality of edge nodes 110 is an intelligent network node and has the capability to make decision of its own, wherein decision made by one edge node 110 may be different to other nodes' decisions. The decisions made by the edge nodes 110 are therefore dynamic and can be analysed by authorised users associated with the network. The broadband network as disclosed herein, is a decentralized wireless broadband network providing multiple redundancy within the network via the plurality of edge nodes 110.

The authorized users including the service providers 102 and the content providers 104 may use respective smart electronic communication devices to facilitate customization of decisions pertaining to personalized content delivery to the end-users. Such devices are capable of executing standard communication protocols (for example, Simple Object Access Protocol or SOAP) that allows processes using different operating systems, such as 'Linux', 'Windows' to communicate via HTTP and its XML. The end-users may use smart user devices to access various available contents being delivered by the one or more content providers 104. The smart electronic communication devices and smart user devices may include high speed computers, smart phones, tablets, laptops, television sets.

Each of the plurality of edge nodes 110 is configured to integrate one or more components including an artificial intelligence (AI) capable compute unit and a smart module. The artificial intelligence (AI) capable compute unit and the smart module are configured to provide customization based on usage pattern of corresponding at least one neighborhood 112. For example, if in a neighborhood 112 or locality, any particular genre of movies or TV shows or gaming apps is popular amongst the users/viewers, then the edge nodes 110 installed at that particular neighborhood 112 is capable to identify the same and compute a score or rating accordingly. The computed scores or ratings may be used and analysed by the authorized users to customize the data traffic flow to and provide personalised content for the end-users.

The edge nodes 110 as configured in the broadband network function as a smart decision maker. This makes the broadband network system as an intelligent network having proactive and reactive capabilities. The proactive capabilities of the broadband network include making updates in real-time, identifying and preventing virus traffic, identifying theft, providing high-speed CDN services. Further, over-the-air (OTA) updates are possible in the network by installing the edge nodes 110 in the network. The pro-active capabilities of the edge nodes 110 as deployed in the broadband network facilitates in saving a large amount of bandwidth. It also facilitates in high-speed data flow and high-speed content delivery. Further, the plurality of edge nodes 110 is configured to perform deep packet inspection (DPI) and to store DPI information thereof. Also, each of the plurality of edge nodes 110 comprises one or more components including: an artificial intelligence (AI) capable compute unit and a smart module for performing the deep packet inspection and one or more caching decisions. Each edge node 110 also contains a storage unit for storing various information including the DPI information and the content as provided by the at least one content provider 104. The DPI information and the at least one score provides dynamic and automated customization of the decisions for content delivery. The information coming from the edge nodes 110 can be used by the authorized users in the network to analyze and to decide which content is to be tagged and to be provided as a personalised content for a particular end-user. The personalised content is eventually made available at the edge location for respective the end-user.

The web platform 106 having a user interface is configured to receive at least one query from the at least one authorized user, such as the content provider 104. The web platform 106 provides convenience to the content providers 104 to access the edge nodes 110 and other resources of the broadband network. The web platform 106 also facilitates the content providers 104 to aptly use network resources based on user preferences and other criteria, analyze available content and accordingly provide interactive functionalities and information over the UX/UI interface for delivering a better and personalized experience for the end-users. For example, certain content of certain specification may be made available at the edge for the end-users before the end-users watch it within that interface. According to the embodiments of the subject matter, the content providers 104 uses application programming interface (API) tools to access the edge resources and obtain information to become context aware, and subsequently deliver the personalized content to the end-users. The content providers 104 are therefore aware of context of the content while selecting and tagging the content for personalization. The service providers 102 also use the web platform 106 to handle incoming service requests in real-time and also dynamically resolve any issues in the network thereby enhancing the overall experience of the end-users or customers. The web platform 106 thus provides a multi-sided web portal for both service providers 102 and content providers 104. Depending upon what the content providers 104 and the service providers 102 have selected as their preferences, the resource distribution and bandwidth management may be carried out along with personalized content delivery at the edge for the end-users at both neighborhood 112 level and the community level.

The at least one authorized user uses the multi-sided web-based platform and select one or more attributes that are built in or predefined. The one or more predefined attributes provide options that the content provider 104 or the service provider 102 may select to provide their preferences and accordingly generate their query. At least one query from at least one authorized user may be received by the server and a response corresponding to the at least one query may be generated. The response may be based on preference data associated with the query, and dynamic scores computed by the edge nodes 110. The response may be analysed by the at least one authorized user to identify which content should be tagged as relevant content for personalization for respective end user. As mentioned above, the at least one authorized user activates a functionality over a UI/UX interface. The functionality may be provided as a separate button or link with an 'Available at the Edge' banner or label showing on the UI/UX interface. The 'Available at the Edge' functionality is seen on the button or the label, and can be easily accessed to enjoy the personalized content for better experience. The implementation of novel UI/UX interface provides all users, the "Available at the Edge" functionality at the network level, at the device level, and also at the application level or 'app' level.

As discussed above, the novel user interface UX/UI provides better experience to the end-users as it shows a separate button or link or icon indicating to the end-users that the content is 'available at the edge'. The content providers 104 such as 'Netflix', 'Hulu', etcetera, may also provide the "Available at the Edge" feature on top of their existing TV or mobile or web applications. The content available at the edge may include videos, VR content, games, etcetera. The UX/UI may also be supported with highly responsive and security driven applications like Dropbox or VPN. An in-built store in the application or an 'App Store' may also be configured within such applications. Further, the user may be facilitated to differentiate and select content and use software applications optimized to their consumption preferences. In various embodiments herein, the 'available at the edge' capabilities may be provided at application level, device level and network level, wherein the 'available at the edge' capabilities may be unique to different applications, devices, and networks.

Figure 2:
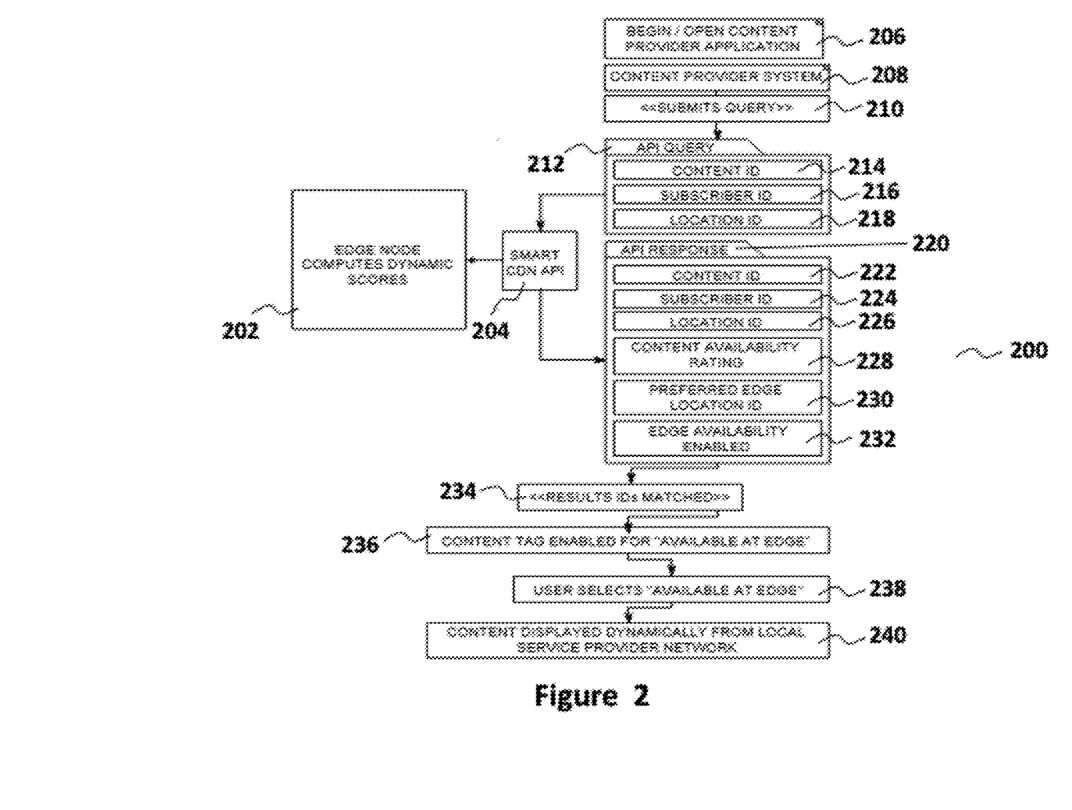
FIG. 2 illustrates various elements implemented to activate a functionality over a UI/UX interface to access the personalized content, according to an embodiment of the present invention.

FIG. 2 illustrates various elements 200 required to activate the "Available at the Edge" functionality over a UI/UX interface, according to an embodiment of the present invention. As described earlier, the content providers 104 use application programming interface (API) tools to access the edge resources and obtain information to become context aware, and subsequently deliver the personalized content to the end-users. Each of the plurality of edge nodes is an intelligent node capable of performing deep packet inspection (DPI) and making caching decisions. The edge nodes 110 are also capable of computing dynamic scores 202 with respect to any content delivered to a corresponding end-user device connected in the broadband network. Further, each of the plurality of edge nodes 110 is configured to store copies of content on edge location caches. The content providers 104 are authorized to receive information from the plurality of intelligent edge nodes 110 in form of a response to their queries. The content providers 104 may generate their queries by initiating respective content provider application 206. The content provider system 208 submits 210 the query to be processed by smart CDN API 204. The content providers 104 through their API, sends at least one query as an API query 212 or request to the server. The API query 212 contains identity information of relevant content, subscriber and location. In a preferred embodiment of the present invention, the identity information associated with the API query 212 includes 'contentID' 214, 'subscriberID' 216 and 'locationID' 218. Further, preference data including dynamic and automated UI/UX elements based on one or more devices, network metadata, end-user preferences, content provider 104 preferences, and service provider 102 preferences may also be taken into consideration while sending the API query 212. The at least one authorized user may be provided with a personalization menu to select relevant content and other relevant information or preference data while generating the API query 212. The preference data includes information pertaining to network resources, network metadata, devices, end-user preferences, content provider preferences, and service provider preferences. The relevant information may continually be updated or adjusted to best fit with the end-users' requirements, use of the internet, applications, and necessary functions across all devices and apps within the broadband network. The personalization menu allows the at least one user to differentiate and select preferred content.

As discussed earlier, the plurality of edge nodes 110 is deployed in vicinity to the end-users' location wherein each of the plurality of edge nodes 110 is capable of computing dynamic scores 202 with respect to any content. Based on the preference data along with the dynamic scores 202 computed by the plurality of edge nodes 110, a response 220 to the at least one query 212 is generated and displayed to the at least one authorized user. The dynamic scores 202 are computed based on one or more parameters or factors including network conditions, content availability, location and network history. The score 202 is computed automatically and dynamically by assigning weights to various predefined parameters. Based on the values of computed scores 202, highest quality content is promptly made available for the end-users in order to provide best possible end-user experience. The response 220 to the at least one query 212 is generated based on preference data and dynamic scores 202. The response 220 is presented to the at least one user as an API response 220 by the server. The API response 220 contains identity information of relevant content, subscriber and location, content availability rating, preferred edge location information, and edge availability enabled 232 status. In a preferred embodiment of the present invention, the identity information associated with the API response 220 are the result IDs (identity information) and includes 'contentID' 222, 'subscriberID' 224, 'locationID' 226, and 'preferred edge locationID' 230.

Once the 'API response' 220 is received by the at least one user, the result IDs 234 are matched and the at least one authorized user analyses the response 220 to accordingly tag relevant content to be personalized and delivered at the edge for the end user. The at least one authorized user or the content provider 104 make the selected content available at the edge for the respective user by activating the 'Available at the Edge' functionality over the UI/UX interface. The functionality is activated by integrating on the UI/UX interface, an executable button, an executable label, or a link, as mutually agreed by the content provider 104 and service provider 102 amongst themselves. The executable button, executable label, or the link displays or reads out 'Available at the Edge' label to show an indication 236 to the end-users that content listed or aggregated therein is available at the edge. The functionality is activated for the end-users at any of a network level, a device level, and an application level. The activated functionality allows the respective end-user to select and access 238 the personalized content. The optimized edge content is displayed 240 dynamically to the end-users from their respective service provider 102 network. The content providers 104 use personalization menu which is configured to allow them to select and tag the content for the respective end-users or customers. The content providers 104 may continually adjust the personalised menu to best fit according to use of the Internet, applications, and functions. The content providers 104 also provide surface recommendation to the end-users via the UI/UX interface. The recommendations may be prepared by categorizing particular type of content across multiple providers for specific end-users. The recommendations may be prepared based on various parameters including streaming speed of different content and different neighborhood 112 levels. Further, different neighborhood 112 level will have different edge availability profile. So each of the neighborhood 112 may have different content available for the end-users. Different neighborhood 112 level may also have different function based on the location. The recommendation may accordingly be provided to the end users.

Figure 3:
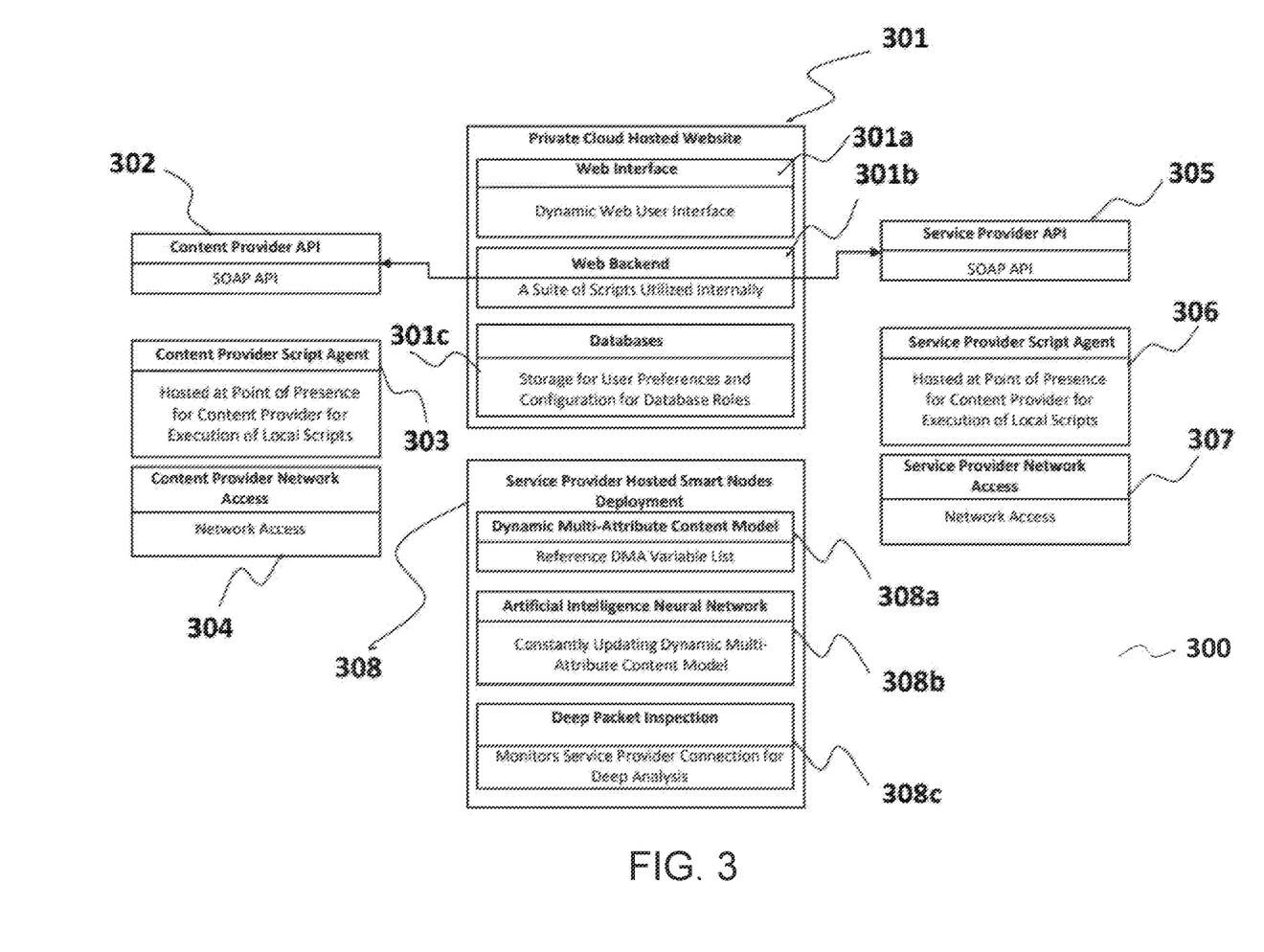
FIG. 3 illustrates various modules of a web platform configured to provide customization of decisions by the content providers and the service providers in the broadband network, according to an embodiment of the present invention.

FIG. 3 illustrates various modules 300 of the web platform 106, according to an embodiment of the present invention. The various modules 300 of the web platform 106 may be configured to provide customization of decisions by the service providers 102 and the content providers 104, and subsequently enabling the activation of 'Available at the Edge' functionality for the end-users. The web platform 106 may be accessed by authorized content providers 104 and authorized service providers 102 via respective smart electronic communication devices. A private cloud hosted website 301 may be provided to enable the at least one authorized user, including content providers 104 and service providers 102 to access the web platform 106. The private cloud hosted website 301 may include a web user interface 301a to allow each of the parties to access the platform. A suite of scripts may be used internally to provide a web backend 301b and one or more storages or databases 301c may be provided for storing user preferences and configurations for database roles. The web backend 301b hosts the suite of scripts for internal utilization, and enables functional interaction between the web interface 301a, one or more databases, and acts as a middleware application for data exchange between the web platform 106, the edge nodes 110, the service provider 102 and the content provider 104. The web backend 301b receives the first preference data from the at least one service provider 102 and the plurality of second preference data from the at least one content provider 104 in the broadband network. The web platform 106 thus provides a single platform for both service providers 102 and the content providers 104 to provide their inputs and process relevant information and data. This subsequently enables both parties in carrying out customization of decisions pertaining to content delivery management and personalization of content for the end-users in the broadband network. The content provider API 302 and the service provider API 305 via respective smart electronic communication devices, are capable of executing standard communication protocols (for example, Simple Object Access Protocol or SOAP) that allow processes using different operating systems, such as 'Linux', 'Windows' to communicate via HTTP and its XML. Further, corresponding script agents may be hosted at Point of Presence for execution of local scripts for each party.

The Simple Object Access Protocol (SOAP) enables the content provider API 302 and the service provider API 305 to exchange information with web platform 106 in the decentralized and distributed application environment. The web backend 301a receives the first preference data from the at least one service provider 102 and the plurality of second preference data from the at least one content provider 104.

The web platform 106 includes a content provider script agent 303, hosted at point of presence (PoP) for the content provider 104 for execution of local scripts. The web platform 106 further includes a service provider script agent 306, hosted at PoP for the content provider 104 for execution of local scripts. A content provider network access 304 and a service provider network access 307 provides network interface with the web platform 106 to the content provider(s) 104 and service provider(s) 102, respectively.

Further, a service provider hosted smart nodes deployment module 308 is provided that comprises dynamic multi-attribute content model 308a, artificial intelligence (AI) neural network 308b, and deep packet inspection modules 308c. The dynamic multi-attribute content model 308a receives plurality of first and second preference data and generates at least one score corresponding to each of the plurality of first and second preference data. Further, the dynamic multi-attribute content model 308a analyzes the DPI information and the at least one score for facilitating dynamic customization of the decisions and thereby delivering personalized content to an end-user. The dynamic multi-attribute content model 308a includes reference DMA variable list. The artificial intelligence neural network 308b facilitates in constantly updating dynamic multi-attribute content model. The deep packet inspection module 308c allows the edge nodes 110 to perform deep analysis of network traffic, or deep packet inspection (DPI) to thereby make decisions necessary for personalized content delivery.

The multi-sided web platform 106 with application programming interface (API) between the service providers 102 and the content providers 104 may be used for mobile application, TV application, or any other applications that is executed on top of the API. The multi-sided web platform 106 between the service providers 102 and the content providers 104 facilitates in automated consolidation and delivery of necessary information that is otherwise not available to the content providers 104 and the service providers 102 to act on it.

The API allows the content providers 104 such as 'Netflix' to access the web platform 106 to build and adjust their interface based on end-users' demand. The content providers 104 are able to use relevant content on an automatic basis based on their preferences. For example, in the events when there is any new release or any video is provided with higher quality and increased resolution, then the content providers 104 are allowed to define and introduce, for a desired period of time, the additional resolution to accommodate the demand on the fly. The content providers 104 therefore have an option to select and prioritize the additional type of content to the neighborhood 112 level. The above described feature thus allows flexibility to the content providers 104 to use the UX/UI interface dynamically according to the on the fly demand.

According to the embodiments of the present disclosure, the preference data or priorities of both parties may include for example content lifespan, content aggregate weight, hardware prioritization, content prioritization, storage requirement, bandwidth requirement, specific content consumption in any neighborhood 112, speed of content delivery, cyber security, deep analysis. The above mentioned factors may be used by the multi attribute model to run prioritization algorithm.

The web platform 106 has a programmable interface and serves as an open platform for the at least one authorized user including the service providers 102 and the content providers 104, to reduce the overall network cost and increase the end-user experience. Both the service providers 102 and the content providers 104 may program the web platform 106 using their respective decision criteria. The web platform 106 also serves as a mediator between the service providers 102 and the content providers 104 and enables each party to cooperate on their terms without sharing data. The the service providers 102 and the content providers 104 use the web platform 106 to handle incoming service requests in real-time and also dynamically resolve any issues in the network thereby enhancing the overall experience of the end-users or customers. The web platform 106 thus provides a multi-sided web portal for both service providers 102 and content providers 104 and allow better resource distribution and bandwidth management along with personalized content delivery at the edge.

According to the embodiments of the present disclosure, one or more databases may be associated with the web platform 106 and may be configured for storing various data related to the dynamic customization of the decisions in the broadband network. As explained above, the plurality of edge nodes 110 is capable of performing the deep packet inspection and computation of dynamic scores or ratings. The edge nodes 110 also analyse usage patterns of a particular neighborhood 112. The deep packet information data and the usage pattern data may be stored in the one or more databases. Through the analysis of usage patterns via the deep packet inspection at a neighborhood 112 level, it becomes possible for the network to identify the requirements and take response actions. The edge nodes 110 installed at the hub-homes 108 facilitate the service providers 102 to make real time updates, change the traffic route, provide customized content to the end-users based on popularity of a content within a particular neighborhood 112 etcetera.

The edge node 110 also contains a smart module having an intelligent content and service engine. The smart module may be a software application that is configured by using technologies like deep machine learning technology and blockchain technology. The smart module dynamically identifies user preferences, content popularity and accordingly facilitates in pushing the content closer to the end-user. With micro deployment of the edge nodes 110 at every hub-home 108, the contents can be made available on the edge of the network. In one embodiment, the smart module also provides the capability of identifying and calculating number of views, likes, reviews, ratings and comments for a particular show, video, movie, or any other content. The machine learning and deep learning techniques may be applied to predict content popularity and accordingly the content may be made available near to the end-user in a particular neighborhood 112. The intelligent content and service engine of the smart module, thus provides customization based on usage pattern to identify and deliver relevant content for the edge network. Accordingly, based on different data packets and neighborhoods 112, each edge node 110 is capable of identifying or detecting the different and dynamic data usage pattern that is relevant to respective end-users. Therefore, different data usage patterns may be identified dynamically by the edge node 110. The intelligent content and service engine of the smart module, may also be configured to analyze historical data to detect the data patterns.

The storage unit is configured to provide a dynamic storage management for the content delivery and edge network distribution. According to the embodiments of the present disclosure, the storage unit via the edge node 110 is available to the end-users' premises at a neighborhood 112 level. The storage unit, being closer to the end-user, i.e., at the neighborhood 112 level, facilitates the content service providers 102 to display personalised content to their users, at a much faster speed as compared to the traditional centralized ISP network architecture. The storage unit is configured as a highly secure and encrypted data storage along with other components of the edge node 110.

In one embodiment, the storage unit is configured as edge cache, which may be specific to the end-users' requirements. The storage unit may have limited storage capacity and therefore may only save the content that are relevant to the edge users. As the preferences and data usage patterns within a neighborhood 112 level or a community level keep changing, the edge node 110 may accordingly make appropriate caching decisions to store the content or associated links for the end-users.

The AI Compute unit uses a customized, learning neural network, for distributing content closer to the end-user thereby providing a high-speed content delivery and low latency. The AI compute unit comprises GPUs (Graphics Processing Units) and/or TPUs (Tensor Processing Units) and is capable of performing continuous analysis on data traffic to identify the data usage pattern dynamically for corresponding neighborhood 112. Based on the analysis, provides improvement in the content delivery management and accordingly creates a chain reaction for improved user experience and efficiency across the network. Each AI-enabled edge compute device enables the pattern recognition necessary to deliver relevant content to the edge.

Figure 4:
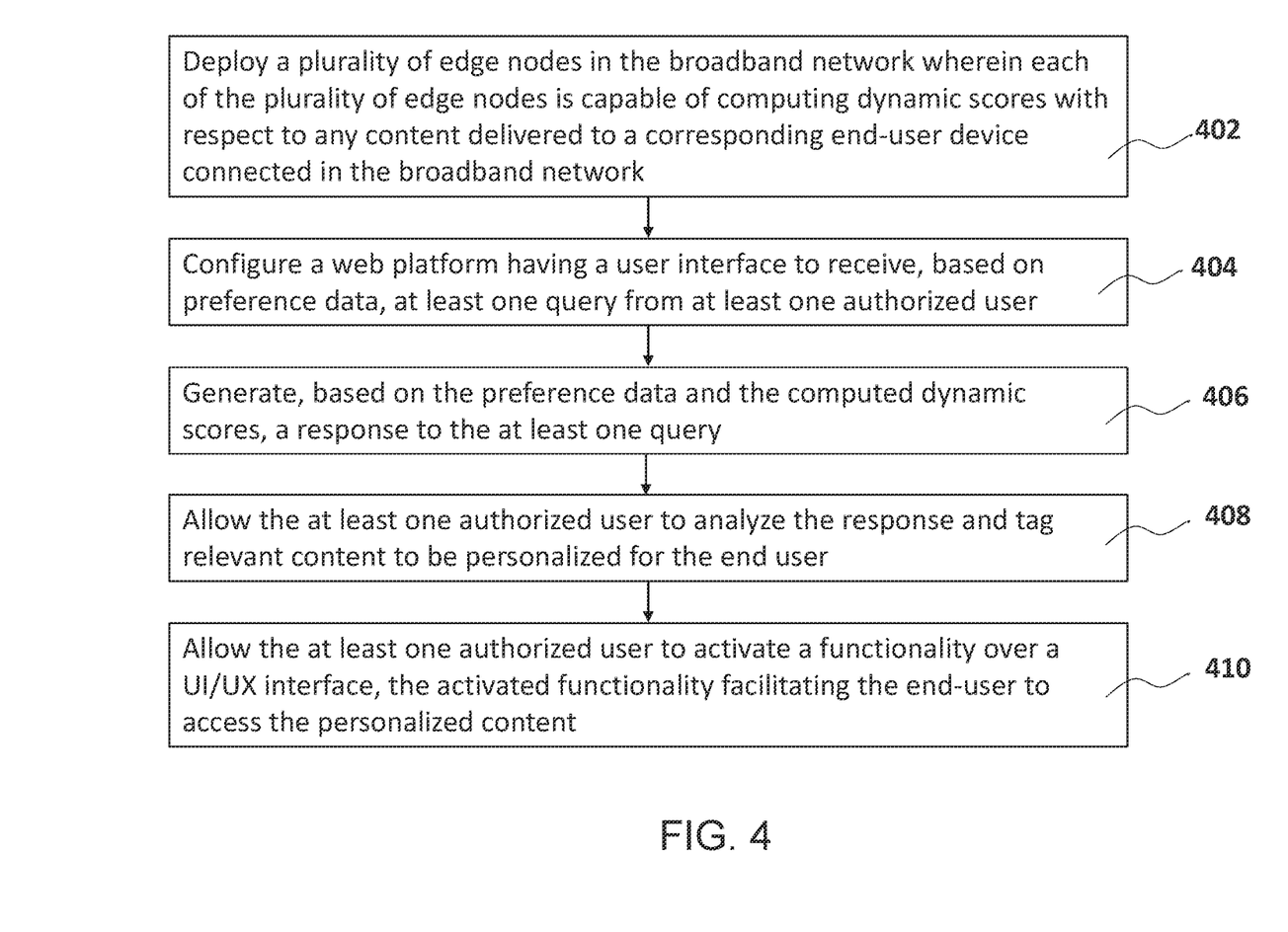
FIG. 4 illustrates a method for facilitating personalized content delivery to end users in a decentralized broadband network, according to an embodiment of the present invention.

FIG. 4 illustrates a method for facilitating personalized content delivery to end users in a decentralized broadband network, according to an embodiment of the present invention.

At step 402, a plurality of edge nodes 110 is deployed at each hub home 108 of at least one neighborhood 112 level in the broadband network. The broadband network is a decentralized wireless broadband network providing multiple redundancy within the network via the plurality of edge nodes 110. The decentralized architecture of the broadband network allows for multiple redundancy within network as compared to the conventional architecture having single point of failure. Each of the plurality of edge nodes 110 comprises one or more components including an artificial intelligence (AI) capable compute unit and a smart module for performing the deep packet inspection and one or more caching decisions. The plurality of edge nodes 110 is capable of making smart decision and also has proactive and reactive capabilities. The plurality of edge nodes 110 in the broadband network is capable of computing dynamic scores with respect to any content delivered to a corresponding end-user device connected in the broadband network. The dynamic scores are computed based on one or more parameters including network conditions, content availability, location and network history. The edge node 110 also comprises a storage unit for storing relevant information and content to be delivered to the user via the 'available at the Edge' functionality of the UX/UI interface. Further, each of the plurality of edge nodes 110 is configured to perform deep packet inspection (DPI) and also store DPI information thereof. The DPI information include information pertaining to network traffic flow, data usage pattern of corresponding at least one neighborhood 112 level, available network resources, storage capacity of a corresponding edge node 110, bandwidth, virus traffic level at an instant, end-user preferences. The plurality of edge nodes 110 is also capable of computing dynamic scores with respect to any content delivered to a corresponding end-user device connected in the broadband network. Each of the plurality of edge nodes 110 is configured to store copies of content on edge location caches.

At step 404 a web platform 106 is configured. The web platform 106 has a programmable user interface that can be accessed by the at least one authorized user including at least one service provider 102 and at least one content provider 104 to provide request or API query. The web platform 106 is a multi-sided web portal for both service providers 102 and content providers 104. It includes script agents hosted at point of presence for each of the content provider 104 and the service provider for execution of local scripts. The web platform 106 receives, based on preference data, at least one query from at least one authorized user.

At step 406, in response to the received at least one query, a response is generated. The preference data provided by the at least one authorized user may be aggregated into a multi-attribute model. Based on the preference data and the computed dynamic scores at the edge nodes 110, the response to the at least one query is generated and sent from the server to the at least one authorized user for facilitating personalization of content for the end-users. the preference data is based on network resources, network metadata, devices, end-user preferences, content provider 104 preferences, and service provider 102 preferences.

At step 408, the at least one authorized user analyses the response and tags relevant content to be personalized for the end user. The relevant content may be identified and tagged from a personalization menu provided by the web platform 106. The personalization menu is configured to allow the content provider 104 to select and tag the content for the respective end-users. The personalization menu is also continually adjusted or updated to best fit according to use of the Internet, applications, and functions. Upon receiving the response by the at least one user, the at least one authorized user analyses the response to tag relevant content to be personalized and delivered at the edge for respective the end-users. The at least one authorized user or the content provider 104 make the selected content available at the edge for the respective user by activating the 'Available at the Edge' functionality over the UI/UX interface. At step 410, the at least one authorized user is allowed to activate a functionality over a UI/UX interface. The activated functionality facilitates the end-user to access the personalized content. The UI/UX interface with activated functionality is dynamic and comprises automated UI/UX elements based on device, network metadata, user preferences, and preferences received from the at least one service provider 102 and the at least one content provider 104. The functionality is activated by integrating any one of: an executable button, an executable label, or a link, over the UI/UX interface. The presence of edge nodes 110 and deep packet inspection at neighborhood 112 level helps the service providers 102 and the content providers 104 to make good decisions and optimized content delivery to the end-users. the functionality is a context aware functionality that is based on context of any content provided by the content provider 104 in the broadband network. Further, the functionality is activated for the end-users at any of a network level, a device level, and an application level. The 'Available at the Edge' label is an indication to the end-users that content listed or aggregated therein is available at the edge.

Any embodiment or implementation described herein is not necessarily to be construed as preferred or advantageous over other embodiments or implementations. Further, the use of terms such as including, comprising, having, containing, is/are, and variations thereof, is meant to encompass the items/components/process listed thereafter and equivalents thereof as well as additional items/components/process.

Although the subject matter is described in language specific to structural features and/or acts, it is to be understood that the subject matter defined in the claims is not necessarily limited to the specific features or process as described above. In fact, the specific features and acts described above are disclosed as mere examples of implementing the claims and other equivalent features and processes which are intended to be within the scope of the claims.

What claimed is:

1. A method for facilitating personalized content delivery in a broadband network for an end-user, the method comprising:

deploying a plurality of edge nodes in the broadband network, each of the plurality of edge nodes capable of computing dynamic scores with respect to any content delivered to a corresponding end-user device connected in the broadband network, wherein the dynamic scores are computed based on one or more parameters including network conditions, content availability, location and network history; and configuring a web-based platform for:
  receiving, based on preference data, at least one query from at least one authorized user, wherein the at least one authorized user is a content provider and a service provider,
  generating, based on the preference data and the computed dynamic scores, a response to the at least one query,
  allowing the at least one authorized user to analyze the response and tag relevant content to be personalized for the end user; and
  allowing the at least one authorized user to activate a functionality over a UI/UX interface, the activated functionality facilitating the end-user to access the personalized content.

2. The method of claim 1, wherein the functionality is activated by integrating any one of: an executable button, an executable label, or a link, over the UI/UX interface.

3. The method of claim 1, wherein the functionality is activated for the end-users at any of a network level, a device level, and an application level.

4. The method of claim 3, wherein the functionality is a context aware functionality that is based on context of any content provided by the content provider in the broadband network.

5. The method of claim 1, wherein the preference data is based on network resources, network metadata, devices, end-user preferences, content provider preferences, and service provider preferences.

6. The method of claim 1, further comprising configuring a personalization menu to allow the content provider to:
   select and tag the content for the respective end-users,
   continually adjust the personalized menu to best fit according to use of the Internet, applications, and functions.

7. The method of claim 1, wherein each of the plurality of edge nodes is an intelligent node capable of performing deep packet inspection (DPI) and making caching decisions.

8. The method of claim 1, wherein each of the plurality of edge nodes is configured to store copies of content on edge location caches.

9. A system for facilitating personalized content delivery in a broadband network for an end-user, the system comprising:
   a plurality of edge nodes deployed in the broadband network, each of the plurality of edge nodes capable of computing dynamic scores with respect to any content delivered to a corresponding end-user device connected in the broadband network, wherein the dynamic scores are computed based on one or more parameters including network conditions, content availability, location and network history;
   a web-based platform configured via a server for:
      receiving, based on preference data, at least one query from at least one authorized user, wherein the at least one authorized user is a content provider and a service provider,
      generating, based on the preference data and the computed dynamic scores, a response to the at least one query,
      allowing the at least one authorized user to analyze the response and tag relevant content to be personalized for the end user;
      allowing the at least one authorized user to activate a functionality over a UI/UX interface, the activated functionality facilitating the end-user to access the personalized content.

10. The system of claim 9, wherein the functionality is activated by integrating any one of: an executable button, an executable label, or a link, over the UI/UX interface.

11. The system of claim 9, wherein the functionality is activated for the end-users at any of a network level, a device level, and an application level.

12. The system of claim 11, wherein the functionality is a context aware functionality that is based on context of any content provided by the content provider in the broadband network.

13. The system of claim 9, wherein the preference data is based on network resources, network metadata, devices, end-user preferences, content provider preferences, and service provider preferences.

14. The system of claim 9, further comprising configuring a personalization menu to allow the content provider to:
   select and tag the content for the respective end-users,
   continually adjust the personalized menu to best fit according to use of the Internet, applications, and functions.

15. The system of claim 9, wherein each of the plurality of edge nodes is an intelligent node capable of performing deep packet inspection (DPI) and making caching decisions.

16. The system of claim 9, wherein each of the plurality of edge nodes is configured to store copies of content on edge location caches.

* * * * *